United States Patent
LaFountain et al.

(10) Patent No.: US 9,882,326 B2
(45) Date of Patent: Jan. 30, 2018

(54) CONFIGURABLE SWITCH EMULATOR MODULE

(71) Applicant: General Equipment and Manufacturing Company, Inc., Louisville, KY (US)

(72) Inventors: Robert Lynn LaFountain, Charlestown, IN (US); Scott Carpenter, Sellersburg, IN (US)

(73) Assignee: General Equipment and Manufacturing Company, Inc., Louisville, KY (US)

( * ) Notice: Subject to any disclaimer, the term of this patent is extended or adjusted under 35 U.S.C. 154(b) by 644 days.

(21) Appl. No.: 14/448,817

(22) Filed: Jul. 31, 2014

(65) Prior Publication Data

US 2015/0039142 A1    Feb. 5, 2015

Related U.S. Application Data

(60) Provisional application No. 61/861,363, filed on Aug. 1, 2013.

(51) Int. Cl.
*H01R 29/00* (2006.01)
*H01H 36/00* (2006.01)
(Continued)

(52) U.S. Cl.
CPC ......... *H01R 29/00* (2013.01); *F16K 37/0033* (2013.01); *G01D 5/2525* (2013.01);
(Continued)

(58) Field of Classification Search
CPC . F16K 37/0033; Y10T 137/8242; G01D 5/06; G01D 5/25; G01D 5/251;
(Continued)

(56) References Cited

U.S. PATENT DOCUMENTS 2,792,559 A * 5/1957 Maberry ................ H01R 29/00
200/11 R
3,210,578 A * 10/1965 Sherer .................... H01R 29/00
310/71
(Continued)

FOREIGN PATENT DOCUMENTS

CN          1979203 A      6/2007
WO    WO-2012061031 A2    5/2012

OTHER PUBLICATIONS

Search Report for PCT/US2014/049335 dated Dec. 3, 2014.
(Continued)

*Primary Examiner* — William McCalister
*Assistant Examiner* — Richard K Durden
(74) *Attorney, Agent, or Firm* — Marshall, Gerstein & Borun LLP (57) ABSTRACT

A target detection assembly includes a detection member adapted to generate a first input signal, and an emulator module is removably secured to the detection member. The emulator module includes an emulator housing assembly removably secured to the detection member and a selection portion is disposed on the emulator housing assembly. The selection portion is configured to be oriented in a first and second selection mode. In the first selection mode, a first emulation circuit disposed within the emulator housing assembly receives the first input signal, processes the first input signal, and outputs a first output signal that is different than the first input signal. In the second selection mode, a second emulation circuit disposed within the emulator housing assembly receives the first input signal, processes the first input signal, and outputs a second output signal that is different than the first input signal and the first output signal.

15 Claims, 5 Drawing Sheets

(51) Int. Cl.
*F16K 37/00* (2006.01)
*G01M 13/00* (2006.01)
*G01D 5/252* (2006.01)
*G05D 7/06* (2006.01)
*G01D 5/06* (2006.01)

(52) U.S. Cl.
CPC .......... *G01M 13/00* (2013.01); *H01H 36/008* (2013.01); *H01H 36/0073* (2013.01); *G01D 5/06* (2013.01); *G05D 7/0635* (2013.01); *Y10T 137/8242* (2015.04)

(58) Field of Classification Search
CPC .... G01D 5/2515; G01D 5/252; G01D 5/2525; G08C 19/30; H01H 36/0073; H01H 36/008; H01H 2036/0086; H01H 2036/0093; H01H 36/02; H01R 27/00; H01R 29/00; H01R 31/02; H01R 31/06

USPC .................................................. 439/218, 221
See application file for complete search history.

(56) References Cited

U.S. PATENT DOCUMENTS

| | | | | |
|---|---|---|---|---|
| 4,258,969 | A * | 3/1981 | Stallard | H01R 24/30 318/739 |
| 4,520,429 | A * | 5/1985 | Hosking | H01R 29/00 200/5 A |
| 5,452,201 | A * | 9/1995 | Pieronek | G05B 19/0421 700/83 |
| 8,400,241 | B2 | 3/2013 | Simmons | |
| 2004/0023560 | A1* | 2/2004 | Swoboda | H01R 31/06 439/638 |
| 2005/0070176 | A1 | 3/2005 | Joegel et al. | |
| 2006/0278006 | A1* | 12/2006 | Hashizume | G01L 13/00 73/716 |
| 2008/0266035 | A1 | 10/2008 | Rohrig et al. | |
| 2009/0160587 | A1* | 6/2009 | Gailledrat | G01D 5/06 335/151 |
| 2012/0007702 | A1* | 1/2012 | Pearce | H01H 36/008 335/207 |
| 2013/0169388 | A1 | 7/2013 | LaFountain et al. | |

OTHER PUBLICATIONS

Written Opinion for PCT/US2014/049335 dated Dec. 3, 2014.
First Office Action received for Chinese Application No. 201410380517.8, dated Nov. 1, 2017.

* cited by examiner

CONFIGURABLE SWITCH EMULATOR MODULE

FIELD OF THE DISCLOSURE

This disclosure relates generally to control valves, and, more particularly, to position detectors used to determine the position of a closure element of control valves.

BACKGROUND

Control valves are used in process control systems to control conditions such as flow, pressure, temperature, and/or liquid level by fully or partially opening or closing in response to a signal received from one or more valve controllers. Typically, a valve controller is operatively coupled to or includes one or more sensors or switches disposed within the system, thereby allowing the valve controller to compare one or more "setpoints" to a corresponding "process variable" whose value is provided by the switches or sensors. The opening or closing of control valves is typically done automatically by electrical, hydraulic, or pneumatic actuators. In addition, positioners may be used to control the opening or closing of the actuator based on, for example, electric or pneumatic signals received from the valve controller.

In typical control valve assemblies, the one or more switches (such as proximity switches) or other sensors of the valve controller are adapted to detect targets (such as magnets) that are coupled to a portion of the valve (e.g., a valve stem) to determine one or more operational parameters of the control valve, such as the position of the closure member of the control valve. The one or more switches or other sensors are generally affixed to a stationary portion of the control valve, such as a portion of the bonnet, and the target is attached to a displaceable stem of the closure member. The one or more switches or other sensors are chosen for a unique application. For example, Namur sensors may be used when it is desired that a resistance output increases from low to high when a target is within a predetermined range of the Namur sensor. As another example, in environments in which flammable gas is present, the switches or other sensors must not output a voltage (or current) above a threshold value that is capable of igniting the flammable gas. Because unique switches and/or sensors (or circuits that include the switches and/or sensors) are required for a correspondingly unique output type, a large inventory of switches is necessary to accommodate custom applications. In addition, if a different output type of output is desired, an entirely different switch or sensor must be purchased and installed.

BRIEF SUMMARY OF THE DISCLOSURE

In accordance with one exemplary aspect of the present invention, a target detection assembly includes a detection member adapted to generate a first input signal and an emulator module is removably secured to the detection member and communicatively coupled to the detection member. The emulator module includes an emulator housing assembly removably secured to the detection member and a selection portion disposed on the emulator housing assembly, the selection portion configured to be oriented in a first selection mode and a second selection mode. In the first selection mode, a first emulation circuit disposed within the emulator housing assembly receives the first input signal, processes the first input signal, and outputs a first output signal that is different than the first input signal. In the second selection mode, a second emulation circuit disposed within the emulator housing assembly receives the first input signal, processes the first input signal, and outputs a second output signal that is different than the first input signal and the first output signal.

In accordance with another exemplary aspect of the present invention, a control valve assembly includes a control valve having a valve housing that defines a valve interior, and a displaceable closure element is disposed at least partially within the valve interior. The closure element is secured to a first portion of a displaceable valve shaft, and a target is secured to a second portion of the valve shaft. A target detection assembly is secured to the valve housing, and the target detection assembly includes a detection member adapted to generate a first input signal when the target is within a predetermined distance of the detection member or is outside of the predetermined distance of the detection member. An emulator module is removably secured to the detection member and communicatively coupled to the detection member. The emulator module includes an emulator housing assembly removably secured to the detection member and a selection portion disposed on the emulator housing assembly, the selection portion configured to be oriented in a first selection mode and a second selection mode. In the first selection mode, a first emulation circuit disposed within the emulator housing assembly receives the first input signal, processes the first input signal, and outputs a first output signal that is different than the first input signal. In the second selection mode, a second emulation circuit disposed within the emulator housing assembly receives the first input signal, processes the first input signal, and outputs a second output signal that is different than the first input signal and the first output signal.

In accordance with a further exemplary aspect of the present invention, a method of configuring an output of a target detection assembly adapted to detect when a target is within a predetermined range of the target detection assembly includes securing a detection member to an emulator housing assembly of an emulator module. The method further includes selecting a first selection mode in which the detection member is communicatively coupled to a first emulation circuit disposed within the emulator housing assembly, and the first emulation circuit is adapted to receive the first input signal, process the first input signal, and output a first output signal that is different than the first input signal. The method also includes selecting a second selection mode in which the detection member is communicatively coupled to a second emulation circuit disposed within the emulator housing assembly, and the second emulation circuit is adapted to receive the first input signal, process the first input signal, and output a second output signal that is different than the first input signal and the first output signal.

DETAILED DESCRIPTION

Figure 1:
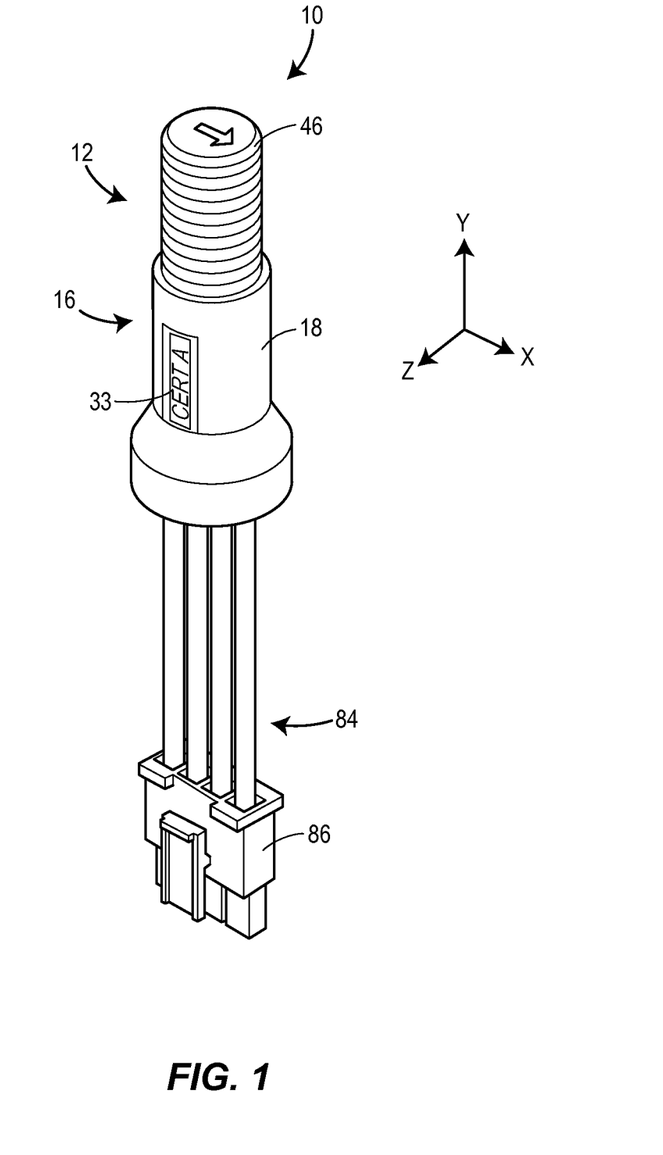
FIG. 1 is perspective view of a target detection assembly.
Figures 3, 4A, 4B, 4C:
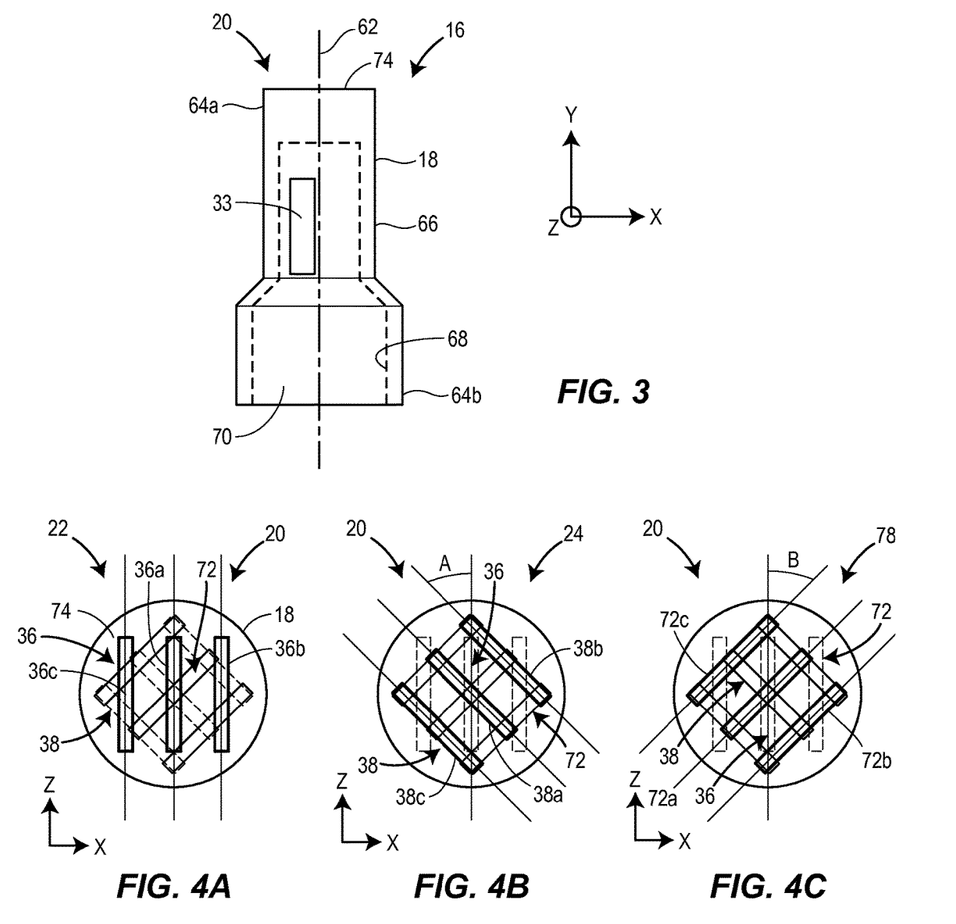
FIG. 3 is a side view of an embodiment of an emulator module 16 of the target detection assembly.
FIG. 4A is a top view of the emulator module 16 of FIG. 3 showing an embodiment of the selection portion 20, with a first plurality of slots shown in bold solid lines, a second plurality of slots shown in dashed lines, and a third plurality of slots shown in light solid lines.
FIG. 4B is a top view of the emulator module 16 of FIG. 3 showing the embodiment of the selection portion illustrated in FIG. 4A, with the second plurality of slots shown in bold solid lines, the first plurality of slots shown in dashed lines, and the third plurality of slots shown in light solid lines.
FIG. 4C is a top view of the emulator module 16 of FIG. 3 showing the embodiment of the selection portion illustrated in FIG. 4A, with the third plurality of slots shown in bold solid lines, the first plurality of slots shown in dashed lines, and the second plurality of slots shown in light solid lines.
Figure 5:
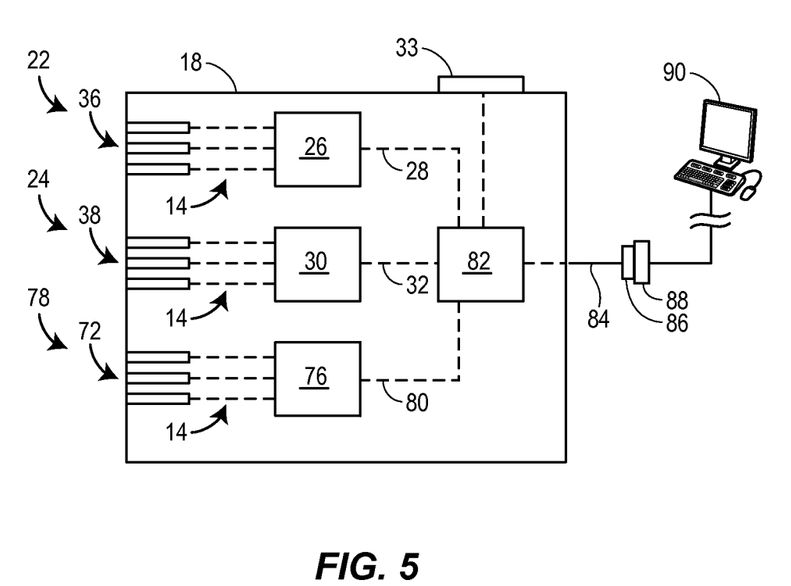
FIG. 5 is a schematic view of an embodiment of the emulator module.

As illustrated in FIGS. 1 and 5, a target detection assembly 10 includes a detection member 12 adapted to generate a first input signal 14. As illustrated in FIGS. 1 and 3, the target detection assembly 10 further includes an emulator module 16 removably secured to the detection member 12 and communicatively coupled to the detection member 12. As illustrated in FIGS. 3, 4A, 4B, and 4C, the emulator module 16 includes an emulator housing assembly 18 adapted to be coupled to the detection member 12 and a selection portion 20 disposed on or coupled to the emulator housing assembly 18. The selection portion 20 is configured to be oriented in a first selection mode 22 (see FIGS. 4A and 5) and a second selection mode 24 (see FIGS. 4B and 5). In the first selection mode 22, as illustrated in FIG. 5, a first emulation circuit 26 disposed within the emulator housing assembly 18 receives the first input signal 14, processes the first input signal 14, and outputs a first output signal 28 that is different than the first input signal 14. In the second selection mode 24, as illustrated in FIG. 5, a second emulation circuit 30 disposed within the emulator housing assembly 18 receives the first input signal 14, processes the first input signal 14, and outputs a second output signal 32 that is different than the first input signal 14 and the first output signal 28. In addition, as illustrated in FIGS. 1, 3, and 5, an indicator element 33 may be coupled to the emulator housing assembly 18 and may be in communication with the first emulation circuit 26 and the second emulation circuit 30, and the indicator element 33 may configured to display a first indicia if the selection portion 20 is in the first selection mode 22 and a second indicia if the selection portion 20 is in the second selection mode 24.

So configured, the detection member 12 of the target detection assembly 10 may include a single type of switch, such a magnetically-triggered proximity switch, that may provide outputs that emulate different types of switches. Specifically, when the selection portion 20 is oriented in the first selection mode 22, the detection member 12 cooperates with the first emulation circuit 26 to provide an output signal that is identical to one of several different switches or sensors, such as a Namur normally open ("N/O") switch or a Namur normally closed ("N/C") switch. If a different output signal is desired, the selection portion 20 may be oriented in the second selection mode 24, in which the detection member 12 cooperates with the second emulation circuit 30 to provide an output that corresponds to that of a desired switch or sensor. The selection portion 20 may be oriented in the first selection mode 22 by inserting a plurality of contact arms 58 of the detection member 12 (see FIGS. 2A and 2B) into a first plurality of slots 36 formed in or on the emulator housing assembly 18 (see FIG. 4A), and the selection portion 20 may be oriented in the second selection mode 24 by inserting the plurality of contact arms 58 of the detection member 12 into a second plurality of slots 38 formed in the emulator housing assembly 18 (see FIG. 4B). The indicator element 33 may automatically and clearly indicate whether the selection portion 20 is oriented in the first selection mode 22, the second selection mode 24, or additional selection modes. Accordingly, a single detection member 12, such as a magnetically-triggered proximity switch, may replace a variety of switches and/or sensors (such as a Namur N/C, Namur N/O, and/or a SPDT switch), thereby eliminating the need to maintain a large inventory of switches for custom applications. Moreover, because it easy to remove and replace the plurality of contact arms 58 of the detection member 12 into the first and second plurality of slots 36, 38, the target detection assembly 10 can be modified in the field quickly and inexpensively.

Figure 2A:
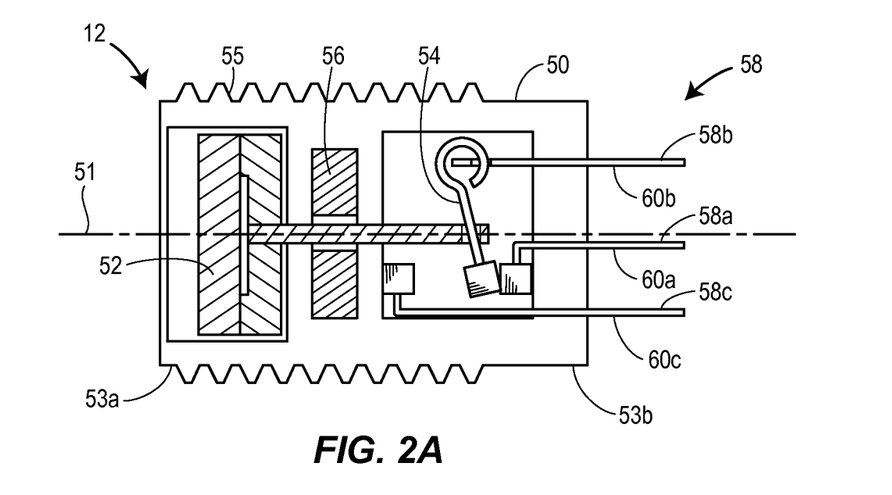
FIG. 2A is a sectional view of an embodiment of a detection member adapted for use in the target detection assembly of FIG. 1, with the detection member in a first position.
Figure 2B:
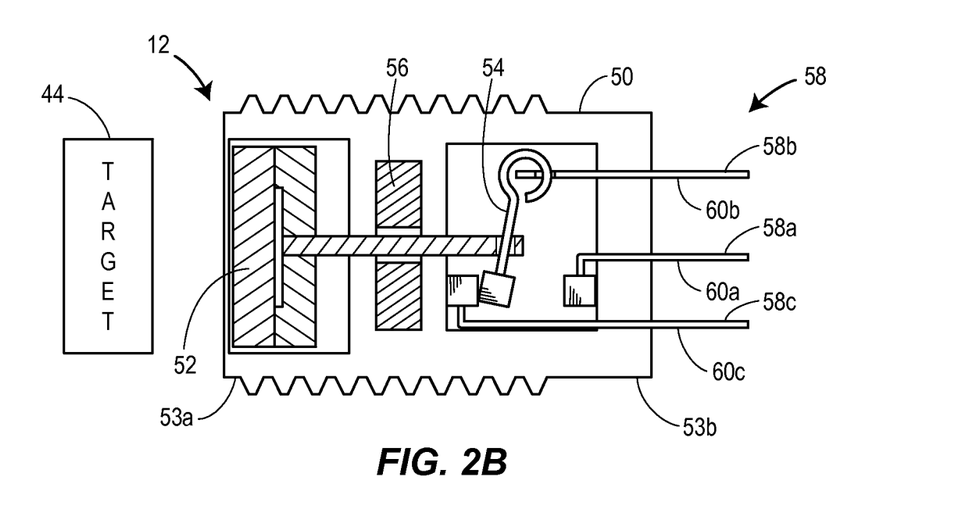
FIG. 2B is a sectional view of the embodiment of the detection member of FIG. 2A with the detection member in a second position.

Turning to the target detection assembly 10 in more detail, the target detection assembly 10 includes a detection member 12, as illustrated in FIGS. 1, 2A, and 2B. The detection member 12 generates the first input signal 14 that may correspond to, for example, an operational parameter of a control valve (such as a control valve 42 illustrated in FIGS. 6A and 6B), and such an operational parameter will be discussed in more detail below. The detection member 12 may be any switch or sensor known in the art that is capable of changing state based on, for example, an operational parameter of the control valve and/or that is capable detecting the presence of a target 44 that may be made from a magnetic material or a ferrous material. For example, the detection member 12 may be a proximity switch that is adapted to detect the presence of one or more targets 44 when the target 44 is within a predetermined distance of a first end 46 of the detection member 12, as illustrated in FIG. 2B.

Figure 6A:
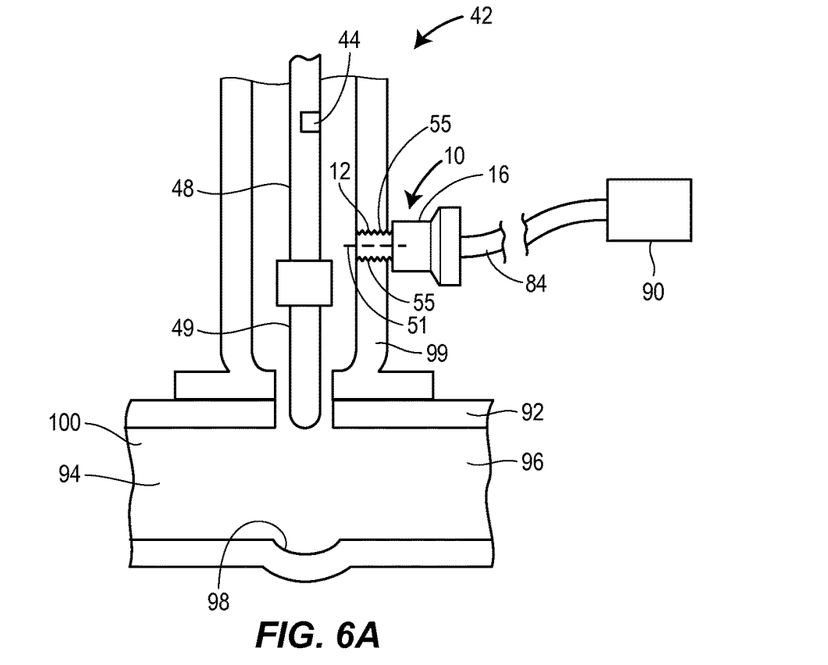
FIG. 6A is a sectional side view of a control valve assembly that includes a control valve and an embodiment of the target detection assembly, with the control valve in an open position.
Figure 6B:
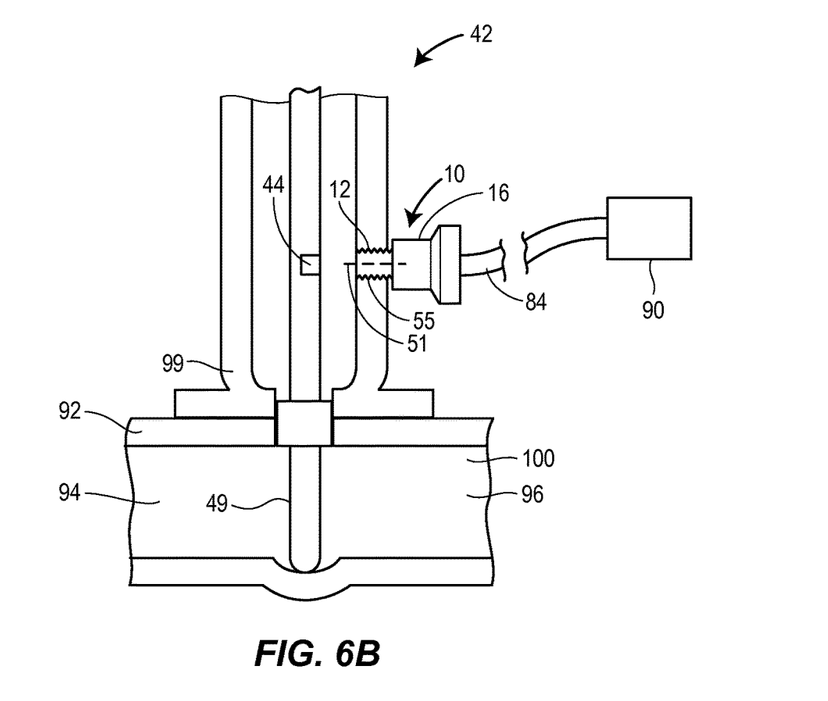
FIG. 6B is a sectional side view of a control valve assembly of FIG. 6A, with the control valve in a closed position.

Because each of the one or more targets 44 may be secured to a valve stem 48 that is itself secured to a closure element 49 of the control valve 42 as illustrated in FIGS. 6A and 6B, the detection member 12 can detect or can cooperate with additional switches or sensors to determine the position of the closure element 49. The detection member 12 may be any suitable type of limit switch, such as a magnetically-triggered proximity switch (such as the magnetically-triggered proximity switches disclosed in U.S. Pat. Nos. 8,400,241 and 9,202,650, which are each incorporated herein by reference). For example, as illustrated in FIGS. 2A and 2B, the detection member 12 may include a switch housing 50 that may be elongated and extend along a longitudinal axis 51 from a first end 53a to a longitudinally opposite second end 53b. The first end 53a of the switch housing 12 may correspond to the first end 46 of the detection member 12. The switch housing 50 may have a cylindrical shape and may have a side wall 55 having a circular cross-sectional shape, and all or a portion of the side wall 47 may be threaded. The switch housing 50 may define an interior portion that encloses a movable magnet 52 coupled to a pivotable arm 54, and the movable magnet 52 may be biased into a first switch position (illustrated in FIG. 2A) by a stationary magnet 56 that exerts a magnetic force on the movable magnet 52. In this first switch position, a contact at an end of the pivotable arm 54 may engage a contact at an end of a primary arm 58a such that a circuit is closed between the primary arm 58a and a common arm 58b (that is coupled to the pivotable arm 54). Each of the primary arm 58a and the common arm 58b may be included in a plurality of contact arms 58 extending from the second end 53b of the switch housing 12. More specifically, the primary arm 58a may have an end portion 60a that longitudinally extends from the second end 53b of the switch housing 12 and the common arm 58b may have an end portion 60b that longitudinally extends from the second end 53b of the switch housing 12. In the first switch position, current may pass between the common arm 58b and the primary arm 58a, and this current may indicate that the detection member 12 is in the first switch position.

When one of the one or more targets 44 is moved into a predetermined range of the first end 46 of the detection member 12, as illustrated in FIG. 2B, the magnetic force between the target 44 and the movable magnet 52 is stronger than the magnetic force between the movable magnet 52 and the stationary magnet 56. Consequently, the movable magnet 52 linearly translates away from the stationary magnet 56 and towards the target 44, thereby rotating the pivotable arm 54 about an end of the common arm 58b. Accordingly, the contact at the end of the pivotable arm 54 disengages from the primary arm 58a and rotates into engagement with a contact at the end of a secondary arm 58c, which may be one of the plurality of contact arms 58 extending from the second end 53b of the switch housing 12. More specifically, the secondary arm 58c may have an end portion 60c that longitudinally extends from the second end 53b of the switch housing 12. The end portion 60c may have a planar, rectangular shape, and the end portion 60c of the secondary arm 58c may be parallel to and offset from the end portion 60b of the common arm 58b and the end portion 60a of the primary arm 58a. When viewed along the longitudinal axis 51, the distance between the end portion 60a of the primary arm 58a and the end portion 60b of the common arm 58b may be equal or substantially equal to the distance between the end portion 60c of the secondary arm 58c and the end portion 60b of the common arm 58b.

With the contact at the end of the pivotable arm 54 in engagement with the contact at the end of a secondary arm 58c, as illustrated in FIG. 2B, a circuit is closed between the secondary arm 58c and the common arm 58b to define the second switch position. In this second switch position, current may pass between the common arm 58b and the secondary arm 58c, and this current may indicate that the detection member 12 is in the second switch position.

As illustrated in FIGS. 1 and 3, the target detection assembly 10 also includes the emulator module 16 that includes the emulator housing assembly 18. The emulator housing assembly 18 may have any suitable shape or dimensions to enclose, contain, or otherwise protect the first emulation circuit 26, the second emulation circuit 30, and any additional emulator circuits. For example, as illustrated in FIG. 3, the emulator housing assembly 18 may have an elongated tubular shape that extends along a housing longitudinal axis 62 from a first end 64a to a longitudinally opposite second end 64b, and the first end 64a may be adapted to be coupled to the detection member 12. The housing longitudinal axis 62 may be parallel to the Y-axis of the reference coordinate system provided in FIGS. 1 and 3.

The emulator housing assembly 18 may have a cylindrical side wall 66 or may have two or more cylindrical segments of different diameters that cooperate to form the side wall 66. The side wall 66 may have any suitable thickness or combination of thicknesses, and an inner surface 68 of the side wall 66 may at least partially define an interior portion 70. The first emulation circuit 26 and the second emulation circuit 30 may be disposed within the interior portion 70 in any suitable manner. The emulator housing assembly 18 may be formed from any suitable material, such as plastic or any other non-magnetic and/or non-ferrous material.

The emulator module 16 of the target detection assembly 10 further includes the selection portion 20 coupled to or disposed on or at least partially through the emulator housing assembly 18. The selection portion 20 may be any part or assembly that may be oriented or otherwise configured in the first selection mode 22 and the second selection mode 24 (and additional selection modes, if desired). For example, as illustrated in FIGS. 4A and 4B, the selection portion 20 may include two or more plurality of slots 36, 38 formed in the emulator housing assembly 18, with each of the two or more plurality of slots 36, 38 adapted to receive a corresponding one of the plurality of contact arms 58 of the detection member 12 (see FIGS. 2A and 2B). More specifically, the selection portion 20 may include the first plurality of slots 36 (see solid lines in FIG. 4A and dashed lines in FIGS. 4B and 4C) formed at or adjacent to the first end 64a of the emulator housing assembly 18 and the second plurality of slots 38 (see dashed lines in FIGS. 4A and 4C and solid lines in FIG. 4B) formed at or adjacent to the first end 64a of the emulator housing assembly 18. The selection portion 20 may also include a third plurality of slots 72 (see solid lines in FIG. 4C and dashed lines in FIGS. 4A and 4B) formed at or adjacent to the first end 64a of the emulator housing assembly 18. The selection portion 20 may further include any suitable number of additional pluralities of slots.

Referring to FIGS. 3 and 4A, the first plurality of slots 36 may be formed on a planar end face 74 disposed at the first end 64a of the emulator housing assembly 18, and the end face 74 may be normal to the housing longitudinal axis 62 (i.e., parallel to the X-Z plane of the reference coordinate system provided in FIGS. 3 and 4A). The first plurality of slots 36 may correspond to the first selection mode 22, illustrated in FIGS. 4A and 5. Each of the first plurality of slots 36 may extend along the housing longitudinal axis 62 towards the second end 64b of the emulator housing assembly 18, and each of the first plurality of slots 36 may be sized and dimensioned to receive a corresponding one of the plurality of contact arms 58 of the detection member 12. For example, the first plurality of slots 36 may include a primary slot 36a adapted to receive all or a portion of the end portion 60a of the primary arm 58a, and the primary slot 36a may have a rectangular cross-sectional shape. The first plurality of slots 36 may also include a common slot 36b adapted to receive all or a portion of the end portion 60b of the common arm 58b, and the common slot 36b may have a rectangular cross-sectional shape. The first plurality of slots 36 may further include a secondary slot 36c adapted to receive all or a portion of the end portion 60c of the secondary arm 58c, and the secondary slot 36c may have a rectangular cross-sectional shape. A longitudinal reference axis that extends along the length of the rectangular cross-sectional shape (when viewed along the housing longitudinal axis 62) of each of the primary slot 36a, common slot 36b, secondary slot 36c may be parallel to the Z-axis of the reference coordinate system of FIG. 4A.

Referring to FIGS. 3 and 4B, the second plurality of slots 38 may be formed on the planar end face 74 disposed at the first end 64a of the emulator housing assembly 18, and each of the second plurality of slots 38 may extend along the housing longitudinal axis 62 towards the second end 64b of the emulator housing assembly 18. The second plurality of slots 38 may correspond to the second selection mode 24, illustrated in FIGS. 4B and 5. Each of the second plurality of slots 38 may be sized and dimensioned to receive a corresponding one of the plurality of contact arms 58 of the detection member 12. For example, the second plurality of slots 38 may include a primary slot 38a adapted to receive all or a portion of the end portion 60a of the primary arm 58a, and the primary slot 38a may have a rectangular cross-sectional shape. The second plurality of slots 38 may also include a common slot 38b adapted to receive all or a portion of the end portion 60b of the common arm 58b, and the common slot 38b may have a rectangular cross-sectional shape. The second plurality of slots 38 may further include a secondary slot 36c adapted to receive all or a portion of the end portion 60c of the secondary arm 58c, and the secondary slot 38c may have a rectangular cross-sectional shape. A longitudinal reference axis that extends along the length of the rectangular cross-sectional shape (when viewed along the housing longitudinal axis 62) of each of the primary slot 38a, common slot 38b, and the secondary slot 38c may be angularly offset to the Z-axis of the reference coordinate system of FIG. 4B by a first angle A.

Referring to FIGS. 3 and 4C, the third plurality of slots 72 may be formed on the planar end face 74 disposed at the first end 64a of the emulator housing assembly 18, and each of the third plurality of slots 72 may extend along the housing longitudinal axis 62 towards the second end 64b of the emulator housing assembly 18. The third plurality of slots 72 may correspond to a third selection mode 78, illustrated in FIGS. 4C and 5. Each of the third plurality of slots 72 may be sized and dimensioned to receive a corresponding one of the plurality of contact arms 58 of the detection member 12. For example, the third plurality of slots 72 may include a primary slot 72a adapted to receive all or a portion of the end portion 60a of the primary arm 58a, and the primary slot 72a may have a rectangular cross-sectional shape. The third plurality of slots 72 may also include a common slot 72b adapted to receive all or a portion of the end portion 60b of the common arm 58b, and the common slot 72b may have a rectangular cross-sectional shape. The third plurality of slots 72 may further include a secondary slot 72c adapted to receive all or a portion of the end portion 60c of the secondary arm 58c, and the secondary slot 72c may have a rectangular cross-sectional shape. A longitudinal reference axis that extends along the length of the rectangular cross-sectional shape (when viewed along the housing longitudinal axis 62) of each of the primary slot 72a, common slot 72b, and the secondary slot 72c may be angularly offset to the Z-axis of the reference coordinate system of FIG. 4C by a second angle B that may be equal and opposite to the first angle A. A fourth plurality of slots (not shown) that correspond to a fourth selection mode (not shown) may be identical to the third plurality of slots 72, but the fourth plurality of slots may be angularly offset to the Z-axis of the reference coordinate system of FIG. 4C by a third angle that is not equal to angle B or angle A. Any number of additional pluralities of slots may also be provided.

The emulator module 16 of the target detection assembly 10 also includes the first emulation circuit 26 disposed within the emulator housing assembly 18 (e.g., within the interior portion 70 of the emulator housing assembly 18), and the first emulation circuit 26 is shown schematically in FIG. 5. The first emulation circuit 26 may be communicatively coupled to the detection member 12 when the selection portion 20 is in the first selection mode 22, as illustrated in FIGS. 4A and 5, for example. In the first selection mode 22, the first emulation circuit 26 disposed within the emulator housing assembly 18 receives the first input signal 14, processes the first input signal 14, and outputs a first output signal 28 that is different than the first input signal 14. The first emulation circuit 26 may be communicatively coupled to the detection member 12 when the selection portion 20 is in the first selection mode 22 in any suitable manner. That is, the detection member 12 may transmit (or may cooperate to transmit, if more than one conductive wires or pathways are employed) the first input signal 14 (e.g., a signal indicating that the detection member 12 in the first switch position of FIG. 2A or in the second switch position of FIG. 2B) between the detection member 12 and the first emulation circuit 26 in any manner known the art. For example, a contact (not shown) may be disposed within each of the first plurality of slots 36 and each contact may be communicatively coupled to the first emulation circuit 26 in any suitable manner, such as by one or more conductive wires or by one or more conductive pathways formed on a printed circuit board ("PCB"). That is, when the end portion 60a of the primary arm 58a is disposed in the primary slot 36a, the contact in the primary slot 36a is in contact with the primary arm 58a such that the primary arm 58a is communicatively coupled to the first emulation circuit 26. In addition, when the end portion 60b of the common arm 58b is disposed in the common slot 36b, the contact in the common slot 36b is in contact with the common arm 58b such that the common arm 58b is communicatively coupled to the first emulation circuit 26. Further, when the end portion 60c of the secondary arm 58c is disposed in the secondary slot 36c, the contact in the secondary slot 36c is in contact with the secondary arm 58b such that the secondary arm 58c is communicatively coupled to the first emulation circuit 26. Any or all of the contacts may be a leaf spring element made of a conductive material (e.g., copper or a copper alloy), with the leaf spring shape providing a biasing force that maintains contact between the contact the corresponding one of the first plurality of slots 36.

The first emulation circuit 26 may be mounted to and/or formed on one or more PCBs that may be disposed in the interior portion 70 of the emulator housing assembly 18. The first emulation circuit 26 may be mounted to and/or formed on the one or more PCBs in any suitable manner that allows the first emulation circuit 26 to receive the first input signal 14 from the detection member 12, process or condition the first input signal 14, and output the first output signal 28, wherein the first output signal 28 has one or more different characteristics than the first input signal 14. The first emulation circuit 26 may include any appropriate components to process the first input signal 14 in a desired manner, such as one or more microprocessors, current limiting circuits, and/or current limiting circuits, for example.

In contemplated embodiments, the first input signal 14 may be processed or conditioned such that the first output signal 28 may be have a higher or lower resistance than the resistance associated with the first input signal 14. For example, the first input signal 14 may be processed or conditioned to emulate the output of a desired switch, such as a Namur N/O ("normally open") switch or a Namur N/C ("normally closed") switch. In these embodiments, a magnetically-triggered proximity switch may replace either of a Namur N/C and/or Namur N/O switch. In other embodiments, the first input signal 14 may be processed or conditioned such that the first output signal 28 may correspond to the output of a SPDT (single pole, double throw) switch, thereby allowing a magnetically-triggered proximity switch to emulate the output of a SPDT switch. In further embodiments, the first input signal 14 may have or correspond to a first voltage and the first output signal 28 may have or correspond to a second voltage that is not equal to the first voltage. In other embodiments, the first input signal 14 may have or correspond to a first current and the first output signal 28 may have or correspond to a second current that is not equal to the first current. The voltage or current levels of the first output signal 28 may be lower than a voltage or current levels of the first input signal 14. Such lower voltage or lower current output signals 26 may be below a voltage or current threshold that allows for intrinsically-safe operation in hazardous environments, such as flammable environments. In other embodiments, the voltage or current levels of the first output signal 28 may be higher than a voltage or current levels of the first input signal 14.

The first input signal 14 may be a signal that is output from the detection member 12, for example. Specifically, the first input signal 14 may be a signal sent or conducted from one or both of the primary arm 58*a* and the common arm 58*b* of the detection member 12 when the detection member 12 is in the first switch position (see FIG. 2A). As an alternative example, the first input signal 14 may be a signal sent or conducted from one or both of the secondary arm 58*c* and the common arm 58*b* of the detection member 12 when the detection member 12 is in the second switch position (see FIG. 2B).

The first output signal 28 may be a signal that corresponds to the first input signal 14 but is different than the first input signal 14. For example, the first input signal 14 may be received and processed and/or conditioned by the first emulation circuit 26, and the first emulation circuit 26 may output the first output signal 28. For example, in the first switch position (see FIG. 2A), a voltage may exist across the primary arm 58*a* and the common arm 58*b* of the detection member 12. As previously explained, the voltage may be above a predetermined limit voltage, and the first emulation circuit 26 may output the first output signal 28 at a voltage below or at the predetermined limit voltage to allow for intrinsically-safe operation in hazardous environments, such as flammable environments.

The emulator module 16 of the target detection assembly 10 also includes the second emulation circuit 30 disposed within the emulator housing assembly 18 (e.g., within the interior portion 70 of the emulator housing assembly 18), as shown schematically in FIG. 5. The second emulation circuit 30 may be communicatively coupled to the detection member 12 when the selection portion 20 is in the second selection mode 24, as illustrated in FIGS. 4B and 5, for example. In the second selection mode 24, the second emulation circuit 30 disposed within the emulator housing assembly 18 receives the first input signal 14, processes the first input signal 14, and outputs a second output signal 32 that is different than the first input signal 14 and the first output signal 28. The second emulation circuit 30 may be communicatively coupled to the detection member 12 when the selection portion 20 is in the first selection mode 24 in any suitable manner. That is, the detection member 12 may transmit (or may cooperate to transmit, if more than one conductive pathways are employed) the first input signal 14 (e.g., a signal indicating that the detection member 12 in the first switch position or in the second switch position) between the detection member 12 and the second emulation circuit 30 in any manner known the art. For example, a contact (not shown) may be disposed within each of the second plurality of slots 38 and each contact may be communicatively coupled to the second emulation circuit 30 in any suitable manner, such as by one or more conductive wires or by one or more conductive pathways formed on a PCB. That is, when the end portion 60*a* of the primary arm 58*a* is disposed in the primary slot 38*a*, the contact in the primary slot 38*a* is in contact with the primary arm 58*a* such that the primary arm 58*a* is communicatively coupled to the second emulation circuit 30. In addition, when the end portion 60*b* of the common arm 58*b* is disposed in the common slot 38*b*, the contact in the common slot 38*b* is in contact with the common arm 58*b* such that the common arm 58*b* is communicatively coupled to the second emulation circuit 30. Further, when the end portion 60*c* of the secondary arm 58*c* is disposed in the secondary slot 38*c*, the contact in the secondary slot 38*c* is in contact with the secondary arm 58*b* such that the secondary arm 58*c* is communicatively coupled to the second emulation circuit 30. Any or all of the contacts may be a leaf spring element made of a conductive material (e.g., copper or a copper alloy), with the leaf spring shape providing a biasing force that maintains contact between the contact the corresponding one of the second plurality of slots 38.

The second emulation circuit 30 may be mounted to and/or formed on a PCB (such as the same PCB that supports the first emulation circuit 26) in any suitable manner that allows the second emulation circuit 30 to receive the first input signal 14 from the detection member 12, process or condition the first input signal 14, and output the second output signal 32, wherein the second output signal 32 has one or more different characteristics than the first input signal 14 and first output signal 26. The second emulation circuit 30 may include any appropriate components to process the first input signal 14 in a desired manner, such as one or more microprocessors, current limiting circuits, and/or current limiting circuits, for example.

In contemplated embodiments, the first input signal 14 may be processed or conditioned such that the second output signal 32 may be have a higher or lower resistance than the resistance associated with the first input signal 14. For example, the first input signal 14 may be processed or conditioned to emulate the output of a desired switch, such as a Namur N/O ("normally open") switch or a Namur N/C ("normally closed") switch. In these embodiments, a magnetically-triggered proximity switch may replace either of a Namur N/C and/or Namur N/O switch. In other embodiments, the first input signal 14 may be processed or conditioned such that the second output signal 32 may correspond to the output of a SPDT (single pole, double throw) switch, thereby allowing a magnetically-triggered proximity switch to emulate the output of a SPDT switch. In further embodiments, the first input signal 14 may have or correspond to a first voltage and the second output signal 32 may have or correspond to a second voltage that is not equal to the first voltage. In other embodiments, the first input signal 14 may have or correspond to a first current and the second output signal 32 may have or correspond to a second current that is not equal to the first current. The voltage or current levels of the second output signal 32 may be lower than a voltage or current levels of the first input signal 14. Such lower voltage or lower current output signal 32 may be below a voltage or current threshold that allows for intrinsically-safe operation in hazardous environments, such as flammable environments. In other embodiments, the voltage or current levels of the second output signal 32 may be higher than a voltage or current levels of the first input signal 14.

The second output signal 32 may be a signal that corresponds to the first input signal 14 but is different than the first input signal 14. For example, the first input signal 14 may be received and processed and/or conditioned by the second emulation circuit 30, and the second emulation circuit 30 may output the second output signal 32. For example, in the first switch position, a voltage may exist across the primary arm 58a and the common arm 58b of the detection member 12. As previously explained, the voltage may be above a predetermined limit voltage, and the second emulation circuit 30 may output the second output signal 32 at a voltage below or at the predetermined limit voltage to allow for intrinsically-safe operation in hazardous environments, such as flammable environments.

The emulator module 16 of the target detection assembly 10 may also include the third emulation circuit 76 disposed within the emulator housing assembly 18 (e.g., within the interior portion 70 of the emulator housing assembly 18), as shown schematically in FIG. 5. The third emulation circuit 76 may be communicatively coupled to the detection member 12 when the selection portion 20 is in the third selection mode 78, as illustrated in FIGS. 4C and 5, for example. In the third selection mode 78, the third emulation circuit 76 disposed within the emulator housing assembly 18 receives the first input signal 14, processes the first input signal 14, and outputs a third output signal 80 that is different than the first input signal 14, the first output signal 28, and the second output signal 32. The third emulation circuit 76 may be communicatively coupled to the detection member 12 when the selection portion 20 is in the third selection mode 78 in any suitable manner. That is, the detection member 12 may transmit (or may cooperate to transmit, if more than one conductive pathways are employed) the first input signal 14 (e.g., a signal indicating that the detection member 12 in the first switch position or in the second switch position) between the detection member 12 and the third emulation circuit 76 in any manner known the art. For example, a contact (not shown) may be disposed within each of the third plurality of slots 72 and each contact may be communicatively coupled to the third emulation circuit 76 in any suitable manner, such as by one or more conductive wires or by one or more conductive pathways formed on a PCB. That is, when the end portion 60a of the primary arm 58a is disposed in the primary slot 72a, the contact in the primary slot 72a is in contact with the primary arm 58a such that the primary arm 58a is communicatively coupled to the third emulation circuit 76. In addition, when the end portion 60b of the common arm 58b is disposed in the common slot 72b, the contact in the common slot 72b is in contact with the common arm 58b such that the common arm 58b is communicatively coupled to the third emulation circuit 76. Further, when the end portion 60c of the secondary arm 58c is disposed in the secondary slot 72c, the contact in the secondary slot 72c is in contact with the secondary arm 58b such that the secondary arm 58c is communicatively coupled to the third emulation circuit 76. Any or all of the contacts may be a leaf spring element made of a conductive material (e.g., copper or a copper alloy), with the leaf spring shape providing a biasing force that maintains contact between the contact the corresponding one of the second plurality of slots 38.

The third emulation circuit 76 may be mounted to and/or formed on a PCB (such as the same PCB that supports the first emulation circuit 26 and the second emulation circuit 30) in any suitable manner that allows the third emulation circuit 76 to receive the first input signal 14 from the detection member 12, process or condition the first input signal 14, and output the third output signal 80, wherein the third output signal 80 has one or more different characteristics than the first input signal 14, the first output signal 26, and the second output signal 32. The third emulation circuit 76 may include any appropriate components to process the first input signal 14 in a desired manner, such as one or more microprocessors, current limiting circuits, and/or current limiting circuits, for example.

In contemplated embodiments, the first input signal 14 may be processed or conditioned such that the third output signal 80 may be have a higher or lower resistance than the resistance associated with the first input signal 14. For example, the first input signal 14 may be processed or conditioned to emulate the output of a desired switch, such as a Namur N/O ("normally open") switch or a Namur N/C ("normally closed") switch. In these embodiments, a magnetically-triggered proximity switch may replace either of a Namur N/C and/or Namur N/O switch. In other embodiments, the first input signal 14 may be processed or conditioned such that the third output signal 80 may correspond to the output of a SPDT (single pole, double throw) switch, thereby allowing a magnetically-triggered proximity switch to emulate the output of a SPDT switch. In further embodiments, the first input signal 14 may have or correspond to a first voltage and the third output signal 80 may have or correspond to a second voltage that is not equal to the first voltage. In other embodiments, the first input signal 14 may have or correspond to a first current and the third output signal 80 may have or correspond to a second current that is not equal to the first current. The voltage or current levels of the third output signal 80 may be lower than a voltage or current levels of the first input signal 14. Such a lower voltage or lower current output signal 80 may be below a voltage or current threshold that allows for intrinsically-safe operation in hazardous environments, such as flammable environments. In other embodiments, the voltage or current levels of the third output signal 80 may be higher than a voltage or current levels of the first input signal 14.

The third output signal 80 may be a signal that corresponds to the first input signal 14 but is different than the first input signal 14. For example, the first input signal 14 may be received and processed and/or conditioned by the third emulation circuit 76, and the third emulation circuit 76 may output the third output signal 80. For example, in the first switch position, a voltage may exist across the primary arm 58a and the common arm 58b of the detection member 12. As previously explained, the voltage may be above a predetermined limit voltage, and the third emulation circuit 76 may output the third output signal 80 at a voltage below or at the predetermined limit voltage to allow for intrinsically-safe operation in hazardous environments, such as flammable environments.

Instead of a first plurality of slots and a second plurality of slots, the selection portion 20 may include a switch (not shown) having two or more switch positions, and the switch may be disposed on the emulator housing assembly 18. Specifically, the plurality of contact arms 58 of the detection member 12 may be received in the first (and only) plurality of slots 36. In a first switch position, any or all of the contact arms 58 may be communicatively coupled to the first emulation circuit 26 as previously described. When the switch is moved into a second switch position, any or all of the contact arms 58 may be communicatively coupled to the second emulation circuit 30 as previously described. In addition, when the switch is moved into a third switch position, any or all of the contact arms 58 may be communicatively coupled to the third emulation circuit 76 as previously described.

As illustrated in FIGS. 1, 3, and 5, the emulator module 16 of the target detection assembly 10 may also include the indicator element 33 that may be coupled to the emulator housing assembly 18 and may be in communication with any or all of the first emulation circuit 26, the second emulation circuit 30, the third emulation circuit 76, and any additional emulation circuits. The indicator element 33 may be configured to display a first indicia (e.g., a first certification) if the selection portion 20 is in the first selection mode 22 associated with the first emulation circuit 26, a second indicia (e.g., a second certification) if the selection portion 20 is in the second selection mode 24 associated with the second emulation circuit 30, and/or a third indicia (e.g., a third certification) if the selection portion 20 is in the third selection mode 78 associated with the third emulation circuit 76. Additional indicia may be displayed for corresponding additional selection modes.

The indicator element 33 may be a window or a screen (e.g., an LCD screen or LED screen) disposed on, secured to, or otherwise coupled to a suitable portion of the emulator housing assembly 18 (such as the side wall 66). The indicator element 33 may be configured to display text and/or numbers, and the first indicia, the second indicia, and the third indicia may be any suitable text and/or numbers that allow a user to identify the selection mode in use and/or the emulation circuit in use. The indicator element 33 may display a corresponding one of the first indicia, second indicia, third indicia, etc., while hiding the remainder of the first indicia, second indicia, third indicia, etc. that do not correspond to the selected selection mode. As illustrated in FIG. 5, the indicator element 33 may be communicatively coupled to a controller 82 that may include (or may be communicatively coupled to) a memory, and the controller 82 (and memory) may be communicatively coupled to the first emulation circuit 26, the second emulation circuit 30, the third emulation circuit 76, and any additional emulation circuits. Alternatively, the indicator element 33 may be communicatively coupled directly to any or all of the first emulation circuit 26, the second emulation circuit 30, the third emulation circuit 76, and any additional emulation circuits. The indicator element 33 may be communicatively coupled to the controller 82 (or directly to any or all of the first emulation circuit 26, the second emulation circuit 30, the third emulation circuit 76, and any additional emulation circuits) by any suitable means, such as by one or more conductive wires and/or by a conductive pathway formed on a PCB.

As illustrated in FIG. 5, the first emulation circuit 26, the second emulation circuit 30, the third emulation circuit 76, and any additional emulation circuits may be communicatively coupled to at least one controller 82, and the controller 82 may receive the first output signal 28, the second output signal 32, and the third output signal 80. In addition, the controller 82 may be communicatively coupled to one or more communication lines 84. Referring to FIG. 1, the one or more communication lines 84 may extend from the second end 64b of the emulator housing assembly 18, and the one or more communication lines 84 may terminate in a connector module 86. As illustrated in FIG. 5, the connector module 86 adapted to couple (e.g., removably couple) to a corresponding connector module 88 that is itself communicatively coupled (e.g., by a wire or wireless connection) to a remote processor or controller, such as a remote computer 90. Accordingly, the remote processor or controller is communicatively coupled to each of the first emulation circuit 26, the second emulation circuit 30, the third emulation circuit 76, and any additional emulation circuits such that the remote processor or controller receives the first output signal 28, the second output signal 32, and the third output signal 80.

Alternatively, the first emulation circuit 26, the second emulation circuit 30, the third emulation circuit 76, and any additional emulation circuits may be communicatively coupled to one or more communication lines 84 such that the one or more communication lines 84 receive and transmit the first output signal 28, the second output signal 32, and the third output signal 80. The one or more communication lines 84 may terminate in the connector module 86, and the connector module 86 may be coupled to the corresponding connector module 88 that is itself communicatively coupled (e.g., by a wire or wireless connection) to a remote processor or controller, such as a remote computer 90, as described above.

The first output signal 28, the second output signal 32, the third output signal 80 and/or any further output signals associated with additional emulation circuits may be provided to any suitable location or device over any number of communication lines, as is known in the art. For example, the output signals 28, 32, 80 may be provided to a valve positioner (not shown) adapted to adjust an actuator to linearly displace the closure element 49 of the control valve 42 (see FIGS. 6A and 6B). The output signals 28, 32, 80 may additionally (or alternatively) be provided to a communication module (not shown) that is adapted to communicate with remote devices, such as a processor or computer, for example. The output signal 28, 32, 80 may additionally (or alternatively) be provided to one or more devices, such as a processor or the computer 90 (see FIG. 5), for example. The device(s) may be located remote from the control valve 42 or directly or indirectly secured to the control valve 42.

As would be appreciated by one skilled in the art, any or all of a Namur N/C, Namur N/O, SPDT, and/or other specialized switches may be replaced by a single switch, such as a magnetically-triggered proximity switch, thereby eliminating the need to maintain separate inventories of different switches. In addition, because the first emulation circuit 26, the second emulation circuit 30, the third emulation circuit 76, and any additional emulation circuits that corresponds to different switch outputs is housed within the emulator module 16, reconfiguring the target detection assembly 10 to have the output of a desired switch requires only repositioning the detection member 12 on the emulator housing assembly 18. Accordingly, replacing an entire target detection assembly to change out a type of switch is no longer necessary, thereby reducing maintenance time and costs. Because only a single type of switch is needed to provide the output of various types of switches, the overall inventory of switches can also be reduced, further reducing costs.

Configured as described, the target detection assembly 10 can be secured to a first object to detect movement of the target 44 relative to the target detection assembly 10. The target detection assembly 10 can therefore be used as a position sensor in a variety of application in which relative movement is to be detected, such as in valve and actuator applications, nuclear applications (i.e., determining the position of fuel rods), and in machine applications (i.e., to determine a crane position). For example, as illustrated in FIG. 6A, the control valve 42 may include a valve housing 92, and the valve housing 92 may include an inlet 94, an outlet 96, and a valve seat 98 disposed between the inlet 94 and the outlet 96. A bonnet 99 may be secured to a top portion of the valve housing 92. The valve housing 92 may define a valve interior 100, and the closure element 49 may be disposed at least partially within the valve interior 100. The closure element 49 may be disposed at a first end of a valve stem 48, and the valve stem 48 may extend through or be surrounded by a portion of the valve housing 92 or the bonnet 99. The valve stem 48 and the closure element 49 may be longitudinally-displaced by an actuator (not shown) from a first position (an open position illustrated in FIG. 6A) in which process fluid flows from the inlet 94 to the outlet 96 to a second position (a closed position illustrated in FIG. 6B) in which the closure element 49 prevents process fluid from flowing from the inlet 94 to the outlet 96. The target detection assembly 10 may be secured to a portion of the bonnet 99 or the valve housing 92 (such as portion of the valve housing 92 surrounding the valve stem 48, or a bracket secured to the valve housing 92) by rotating the detection member 12 such that the threaded side wall 55 engages a threaded bore formed in the bonnet 99 or the valve housing 92. As such, the longitudinal axis 51 of the detection member 12 may be normal to a longitudinal axis of the valve stem 48. In addition, the target 44 may be secured to the valve stem 48. The one or more communication lines 84 that extend from the second end 64b of the emulator housing assembly 18 may be communicatively coupled to the remote computer 90, as previously described.

When the control valve 42 is in the first position illustrated in FIG. 6A, the target 44 is not within a predetermined range of the detection member 12 disposed within the housing 12. Accordingly, the magnetic force between the movable magnet 52 and the stationary magnet 56 of the detection member 12 is greater than the magnetic force between the movable magnet 52 and the target 44, and the detection member 12 is in the first switch position (illustrated in FIG. 2A). Consequently, a circuit is completed between the primary arm 58a and the common arm 58b, and the closed circuit that results from the first switch position can be detected by the remote computer 90 as previously described.

However, when the control valve 42 is in the second position of FIG. 2B (due to an emergency shut-down condition, for example), the magnetic target 44 is moved into a position within a predetermined range of the detection member 12. Consequently, the magnetic force between the target 44 and the movable magnet 52 becomes greater than the magnetic force between the movable magnet 52 and the stationary magnet 56. The greater force displaces the pivotable arm 54 into the second switch position (shown in FIG. 2B), and the closed circuit that results from the second switch position can be detected by the remote computer 90 as previously described.

While various embodiments have been described above, this disclosure is not intended to be limited thereto. Variations can be made to the disclosed embodiments that are still within the scope of the appended claims.

What is claimed is:

1. A target detection assembly comprising:
   a detection member adapted to generate a first input signal, the detection member including a plurality of contact arms;
   an emulator module removably secured to the detection member and communicatively coupled to the detection member, the emulator module comprising:
   an emulator housing assembly removably secured to the detection member; and
   a selection portion comprising a first plurality of slots and a second plurality of slots offset from the first plutality of slots, each of the first and second pluralities of slots formed in the emulator housing assembly, the selection portion configured to be oriented in a first selection mode when each of the plurality of contact arms of the detection member is received in a corresponding one of the first plurality of slots and a second selection mode when each of the plurality of contact arms of the detection member is received in a corresponding one of the second plurality of slots,
   wherein in the first selection mode, a first emulation circuit disposed within the emulator housing assembly receives the first input signal, processes the first input signal, and outputs a first output signal that is different than the first input signal, and
   in the second selection mode, a second emulation circuit disposed within the emulator housing assembly receives the first input signal, processes the first input signal, and outputs a second output signal that is different than the first input signal and the first output signal.

2. The target detection assembly of claim 1, wherein the detection member includes a switch housing, and wherein the plurality of contact arms extend longitudinally from an end of the switch housing.

3. The target detection assembly of claim 1, wherein the selection portion includes a third plurality of slots that are adapted to receive the plurality of contact arms of the detection member, and wherein the selection portion is configured to be oriented in a third selection mode in which each of the plurality of contact arms of the detection member is received in a corresponding one of the third plurality of slots, and wherein in the third selection mode, a third emulation circuit disposed within the emulator housing assembly receives the first input signal, processes the first input signal, and outputs a third output signal that is different than the first input signal, the first output signal, and the second output signal.

4. The target detection assembly of claim 1, the emulator module further comprising an indicator element coupled to the emulator housing assembly and in communication with the first emulation circuit and the second emulation circuit, the indicator element configured to display a first indicia if the selection portion is in the first selection mode and a second indicia if the selection portion is in the second selection mode.

5. The target detection assembly of claim 4, wherein the selection portion is configured to be oriented in a third selection mode, wherein in the third selection mode, a third emulation circuit disposed within the emulator housing assembly receives the first input signal, processes the first input signal, and outputs a third output signal that is different than the first input signal, the first output signal, and the second output signal, and wherein the indicator element is configured to display a third indicia if the selection portion is in the third selection mode.

6. The target detection assembly of claim 1, wherein the detection member is a magnetically-actuated proximity switch.

7. A control valve assembly comprising:
   a control valve having a valve housing that defines a valve interior;
   a displaceable closure element disposed at least partially within the valve interior, the closure element secured to a displaceable valve stem;

a target secured to the valve stem;

a target detection assembly secured to the valve housing, the target detection assembly comprising:

a detection member adapted to generate a first input signal when the target is within a predetermined distance of the detection member or is outside of the predetermined distance of the detection member, the detection member having a plutality of contact arms;

an emulator module removably secured to the detection member and communicatively coupled to the detection member, the emulator module comprising:

an emulator housing assembly removably secured to the detection member; and a selection portion comprising a first plurality of slots and a second plutality of slots offset from the first plutality of slots, each of the first and second pluralities of slots formed in the emulator housing assembly, the selection portion configured to be oriented in a first selection mode when each of the plurality of contact arms of the detection member is received in a corresponding one of the first plurality of slots and a second selection mode when each of the plurality of contact arms of the detection member is received in a corresponding one of the second plurality of slots, wherein in the first selection mode, a first emulation circuit disposed within the emulator housing assembly receives the first input signal, processes the first input signal, and outputs a first output signal that is different than the first input signal, and in the second selection mode, a second emulation circuit disposed within the emulator housing assembly receives the first input signal, processes the first input signal, and outputs a second output signal that is different than the first input signal and the first output signal.

8. The control valve assembly of claim 7, wherein the detection member includes a switch housing, and wherein the plurality of contact arms extend longitudinally from an end of the switch housing.

9. The control valve assembly of claim 7, wherein the emulator housing assembly includes a third plurality of slots that are adapted to receive the plurality of contact arms of the detection member, and wherein the selection portion is configured to be oriented in a third selection mode in which each of the plurality of contact arms of the detection member is received in a corresponding one of the third plurality of slots, and wherein in the third selection mode, a third emulation circuit disposed within the emulator housing assembly receives the first input signal, processes the first input signal, and outputs a third output signal that is different than the first input signal, the first output signal, and the second output signal.

10. The control valve assembly of claim 7, the emulator module further comprising an indicator element coupled to the emulator housing assembly and in communication with the first emulation circuit and the second emulation circuit, the indicator element configured to display a first indicia if the selection portion is in the first selection mode and a second indicia if the selection portion is in the second selection mode.

11. The control valve assembly of claim 10, wherein the selection portion is configured to be oriented in a third selection mode, wherein in the third selection mode, a third emulation circuit disposed within the emulator housing assembly receives the first input signal, processes the first input signal, and outputs a third output signal that is different than the first input signal, the first output signal, and the second output signal, and wherein the indicator element is configured to display a third indicia if the selection portion is in the third selection mode.

12. The control valve assembly of claim 7, wherein the detection member is a magnetically-actuated proximity switch.

13. A method of configuring an output of a target detection assembly adapted to detect when a target is within a predetermined range of the target detection assembly, the method comprising:

securing a detection member to an emulator housing assembly of an emulator module;

selecting a first selection mode in which the detection member is communicatively coupled to a first emulation circuit disposed within the emulator housing assembly, the first emulation circuit being adapted to receive a first input signal from the detection member, process the first input signal, and output a first output signal that is different than the first input signal;

selecting a second selection mode in which the detection member is communicatively coupled to a second emulation circuit disposed within the emulator housing assembly, the second emulation circuit being adapted to receive the first input signal, process the first input signal, and output a second output signal that is different than the first input signal and the first output signal, wherein selecting a first selection mode includes inserting each of a plurality of contact arms of the detection member in a corresponding one of a first plurality of slots formed in the emulator housing assembly, and wherein selecting a second selection mode includes inserting each of the plurality of contact arms of the detection member in a corresponding one of a second plurality of slots formed in the emulator housing assembly and offset from the first plurality of slots.

14. The method of claim 13, further comprising:

selecting a third selection mode in which the detection member is communicatively coupled to a third emulation circuit disposed within the emulator housing assembly, the third emulation circuit being adapted to receive the first input signal, process the first input signal, and output a third output signal that is different than the first input signal, the first output signal, and the second output signal.

15. The method of claim 13, further comprising:

displaying a first indicia on an indicator element coupled to the emulator housing assembly when the first selection mode is selected; and displaying second indicia on the indicator element coupled to the emulator housing assembly when the second selection mode is selected.

* * * * *

UNITED STATES PATENT AND TRADEMARK OFFICE
CERTIFICATE OF CORRECTION

| | | |
|---|---|---|
| PATENT NO. | : 9,882,326 B2 | Page 1 of 1 |
| APPLICATION NO. | : 14/448817 | |
| DATED | : January 30, 2018 | |
| INVENTOR(S) | : Robert L. LaFountain et al. | |

It is certified that error appears in the above-identified patent and that said Letters Patent is hereby corrected as shown below:

In the Claims

At Column 15, Line 61, "plutality" should be -- plurality --.

At Column 17, Line 7, "member,the" should be -- member, the --.

Signed and Sealed this
Fourteenth Day of April, 2020

Andrei Iancu
*Director of the United States Patent and Trademark Office*